United States Patent
Saha et al.

(10) Patent No.: US 9,543,881 B2
(45) Date of Patent: Jan. 10, 2017

(54) ROTARY ELECTRIC MACHINE DRIVING DEVICE

(71) Applicant: AISIN AW CO., LTD., Anjo-shi, Aichi-ken (JP)

(72) Inventors: Subrata Saha, Anjo (JP); Yasuhiko Kobayashi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/761,823

(22) PCT Filed: Mar. 26, 2014

(86) PCT No.: PCT/JP2014/058607
§ 371 (c)(1),
(2) Date: Jul. 17, 2015

(87) PCT Pub. No.: WO2014/157373
PCT Pub. Date: Oct. 2, 2014

(65) Prior Publication Data
US 2015/0365038 A1   Dec. 17, 2015

(30) Foreign Application Priority Data
Mar. 29, 2013   (JP) ................ 2013-071653

(51) Int. Cl.
*H02P 1/00* (2006.01)
*H02P 3/00* (2006.01)
(Continued)

(52) U.S. Cl.
CPC ............. *H02P 27/06* (2013.01); *H02M 1/15* (2013.01); *H02M 7/5395* (2013.01); *H02M 7/53873* (2013.01)

(58) Field of Classification Search
CPC .................. H02P 27/06; H02M 1/15
(Continued)

(56) References Cited

U.S. PATENT DOCUMENTS 3,577,059 A * 5/1971 Kelley, Jr. ........... H02M 7/1557
   363/48
4,437,050 A * 3/1984 Overzet ............. H02M 5/4585
   318/798
(Continued)

FOREIGN PATENT DOCUMENTS

JP   2003-219655 A   7/2003
JP   2005-020837 A   1/2005
(Continued)

*Primary Examiner* — Erick Glass
(74) *Attorney, Agent, or Firm* — Oliff PLC

(57) ABSTRACT

A rotary electric machine driving device that drives and controls an alternating-current rotary electric machine, the rotary electric machine driving device including: an inverter that is electrically interposed between a direct-current power supply and the rotary electric machine, and converts electric power between a direct current and an alternating current; a smoothing capacitor that is electrically interposed between the direct-current power supply and the inverter, and is connected between a positive pole and a negative pole on a direct-current side of the inverter; and an inverter control unit that controls switching of a switching element of the inverter according to a predefined switching frequency.

5 Claims, 9 Drawing Sheets

(51) Int. Cl.
 *H02P 5/00* (2016.01)
 *H02P 27/06* (2006.01)
 *H02M 1/15* (2006.01)
 *H02M 7/5395* (2006.01)
 *H02M 7/5387* (2007.01)

(58) Field of Classification Search
 USPC .......................................................... 318/139
 See application file for complete search history.

(56) References Cited

U.S. PATENT DOCUMENTS

2012/0056568 A1* 3/2012 Kuroki .................... H02P 23/20
 318/400.3
2013/0039104 A1* 2/2013 Sharma ................... H02M 1/10
 363/123

FOREIGN PATENT DOCUMENTS

| JP | 2009-106046 A | 5/2009 |
| JP | 2013-027149 A | 2/2013 |
| WO | 2013/018820 A1 | 2/2013 |

* cited by examiner

ROTARY ELECTRIC MACHINE DRIVING DEVICE

BACKGROUND

The present disclosure relates to a rotary electric machine driving device that drives and controls an alternating-current rotary electric machine.

In recent years, from the viewpoint of, for example, energy saving and reduction of environmental loads, hybrid vehicles and electric vehicles each provided with a rotary electric machine as a source of driving force have been gaining attention. Such a vehicle includes a direct-current power supply, such as a battery, which supplies power when the rotary electric machine functions as the source of driving force (motor), and stores generated power when the rotary electric machine functions as a source of power (generator). When the rotary electric machine functions as the source of driving force (motor), direct-current power supplied from the battery is converted into alternating-current power by an inverter to drive the rotary electric machine. When the rotary electric machine functions as the generator, alternating-current power generated by the rotary electric machine is converted into direct-current power by the inverter to be stored as regenerated power in the battery.

A capacitor for smoothing the direct-current power is provided between the battery and the inverter to reduce fluctuation, such as pulsation, of the direct-current power. In general, the direct-current side of the inverter for driving the rotary electric machine as the source of driving force of a hybrid vehicle or an electric vehicle is at a high voltage of 200 [V] to 400 [V]. Hence, the smoothing capacitor is required to have a high voltage resistance performance against such a high voltage, and at the same time, the fluctuation due to the pulsation needs to be considered. In addition, when withstand voltages of switching elements forming the inverter are considered, the smoothing capacitor is required to have a sufficient capacitance for reducing the pulse component. These requirements generally increase the cost of the smoothing capacitor, and increase the physical size thereof, thus requiring a large installation space. Furthermore, the inverter and the smoothing capacitor are often installed in an integrated manner or close to each other, as parts of a rotary electric machine driving device. In particular, an in-vehicle rotary electric machine driving device is required to be light in weight and small in size from the viewpoint of weight and installation space, so that the inverter and the smoothing capacitor are desired to be light in weight and small in size.

For example, Japanese Patent Application Publication No. 2009-106046 (JP 2009-106046 A) describes a space-saving rotary electric machine driving device (power converter) including a cooling mechanism. In this rotary electric machine driving device, a power module including switching elements is disposed on a flat surface inside of a case having a heat radiating portion. A smoothing capacitor electrically connected to the power module is disposed adjacent to the power module on a flat surface formed one step lower than the flat surface on which the power module is disposed (refer to paragraphs 7 and 8, FIG. 1, etc.). The smoothing capacitor required to have a high withstand voltage and large capacity tends to have a large physical size. In JP 2009-106046 A, the heat radiating portion and the power module are disposed in accordance with the height of the smoothing capacitor such that the overall height of the rotary electric machine driving device is reduced, thereby saving space.

In this manner, space saving can be achieved to some extent by making improvements in the layout of, for example, the circuit portion (power module), the cooling mechanism, and the smoothing capacitor of the inverter. However, reduction of weight and size of the entire device has not been accomplished by reducing the physical size of the smoothing capacitor to be determined by the withstand voltage and the capacitance. If the capacity of the smoothing capacitor is reduced, the size can be reduced, but the pulse component described above cannot be sufficiently reduced, causing a possible degradation in effects of reducing deterioration of the battery and deterioration of the switching elements.

In general, the direct-current power supply includes a resistance component (R component) and an induction component (L component). Hence, an RLC circuit is formed in conjunction with the capacity component (C component) of the smoothing capacitor. As a result, a direct-current side voltage gain obtained by dividing a system voltage as a voltage on the direct-current side of the inverter by a system current that is a current on the direct-current side of the inverter exhibits a frequency characteristic that has a resonance point. Of the R, L, and C components, impedance components dependent on the frequency are the L component and the C component, so that the value of the direct-current side voltage gain increases as the frequency increases from zero, reaches the maximum value (resonance point) at a resonance frequency, and decreases as the frequency increases based on the resonance point serving as an inflection point. The pulsation of the system voltage occurs in association with fluctuation in current and voltage associated with the switching of the switching elements of the inverter. The amount (amplitude) of the pulsation increases corresponding to the value of the direct-current side voltage gain as an indicator. In other words, the pulsation of the system voltage occurs corresponding to a switching frequency of the switching elements. Hence, in the case of reducing the capacity of the smoothing capacitor, it is preferable to consider the switching frequency of the switching elements of the inverter.

SUMMARY

In view of the background described above, a technique is desired that can reduce the capacity of a smoothing capacitor on the direct-current side of an inverter while reducing the fluctuation, such as the pulsation, of the voltage and the current on the direct-current side of the inverter.

According to an exemplary embodiment of the present disclosure, a characteristic feature (first characteristic feature) of a rotary electric machine driving device that drives and controls an alternating-current rotary electric machine resides in including an inverter that is electrically interposed between a direct-current power supply and the rotary electric machine, and converts electric power between a direct current and an alternating current, in including a smoothing capacitor that is electrically interposed between the direct-current power supply and the inverter, and is connected between a positive pole and a negative pole on a direct-current side of the inverter, and in including an inverter control unit that controls switching of a switching element of the inverter according to a predefined switching frequency, and resides in that, based on a frequency characteristic of a direct-current side voltage gain obtained by dividing a system voltage that is a voltage on the direct-current side of the inverter by a system current that is a current on the direct-current side of the inverter, the inverter control unit sets the switching frequency to a high frequency equal to or higher than a maximum frequency at which a value of the direct-current side voltage gain is equal to a value thereof at a frequency of zero in the frequency characteristic of the direct-current side voltage gain.

According to an exemplary embodiment of the present disclosure, another characteristic feature (second characteristic feature) of a rotary electric machine driving device that controls drive of an alternating-current rotary electric machine resides in including an inverter that is electrically interposed between a direct-current power supply and the rotary electric machine, and converts electric power between a direct current and an alternating current, in including a smoothing capacitor that is electrically interposed between the direct-current power supply and the inverter, and is connected between a positive pole and a negative pole on a direct-current side of the inverter, and in including an inverter control unit that controls switching of a switching element of the inverter according to a predefined switching frequency, and resides in that, based on a frequency characteristic of a direct-current side current gain obtained by dividing a current of the direct-current power supply by a system current that is a current on the direct-current side of the inverter, the inverter control unit sets the switching frequency to a frequency equal to or higher than a frequency at which a value of the direct-current side current gain is equal to a value thereof at a frequency of zero in the frequency characteristic of the direct-current side current gain.

According to an exemplary embodiment of the present disclosure, still another characteristic feature (third characteristic feature) of a rotary electric machine driving device that drives and controls an alternating-current rotary electric machine resides in including an inverter that is electrically interposed between a direct-current power supply and the rotary electric machine, and converts electric power between a direct current and an alternating current, in including a smoothing capacitor that is electrically interposed between the direct-current power supply and the inverter, and is connected between a positive pole and a negative pole on a direct-current side of the inverter, and in including an inverter control unit that controls switching of a switching element of the inverter according to a predefined switching frequency, and resides in that, based on a frequency characteristic of a direct-current side voltage gain obtained by dividing a system voltage that is a voltage on the direct-current side of the inverter by a system current that is a current on the direct-current side of the inverter, and also on a frequency characteristic of a direct-current side current gain obtained by dividing a current of the direct-current power supply by the system current, the inverter control unit sets the switching frequency to a frequency that is equal to or higher than a frequency at which a value of the direct-current side voltage gain is equal to a value thereof at a frequency of zero in the frequency characteristic of the direct-current side voltage gain, and the inverter control unit sets the switching frequency to a frequency that is equal to or higher than a frequency at which a value of the direct-current side current gain is equal to a value thereof at a frequency of zero in the frequency characteristic of the direct-current side current gain.

As described above, the value of the direct-current side voltage gain increases as the frequency increases from zero, reaches the maximum value (resonance point) at the resonance frequency, and decreases as the frequency increases from the resonance point serving as an inflection point. In the same manner, the value of the direct-current side current gain increases as the frequency increases from zero, reaches the maximum value (resonance point) at the resonance frequency, and decreases as the frequency increases from the resonance point serving as an inflection point. Of frequencies of pulsation components occurring in the system voltage or the current of the direct-current power supply (such as a current flowing into or out of the direct-current power supply), one of influential frequencies is known to be a frequency component twice the switching frequency. When the resonance frequency described above is close to the frequency twice the switching frequency, the value of the direct-current side voltage gain or the direct-current side current gain is large, so that the amplitude of the pulsation is large. Hence, the frequency twice the switching frequency is preferably away from the resonance frequency. According to the characteristic features described above, the switching frequency is set to a frequency equal to or higher than a frequency at which the value of the direct-current side voltage gain or the direct-current side current gain is equal to the value thereof at the frequency of zero. Each of the value of the direct-current side voltage gain and the value of the direct-current side current gain reaches the maximum value at the resonance frequency that is a frequency of zero or above, and decreases as the frequency shifts away from the resonance frequency. Hence, the value of the direct-current side voltage gain or the direct-current side current gain becomes equal to the value thereof at the frequency of zero, at a frequency exceeding and sufficiently away from the resonance frequency, and each of the value of the direct-current side voltage gain and the value of the direct-current side current gain reaches a value sufficiently smaller than that of the resonance point. As a result, the frequency twice the switching frequency, which is still higher than the frequency sufficiently away from the resonance frequency, results in a frequency sufficiently higher than the frequency at which the value of the direct-current side voltage gain or the direct-current side current gain is maximum, and thus is away from the resonance frequency. As a result, the pulsations of the system voltage, the current of the direct-current power supply, and the like are kept from increasing.

If the smoothing capacitor has a sufficiently large capacity compared with the induction component included in the direct-current power supply, the sharpness of the resonance is relatively mild. In other words, the value of the direct-current side voltage gain or the direct-current side current gain at the resonance frequency is relatively small, so that the amount of the difference between the resonance frequency and the frequency twice the switching frequency is not a large issue in many cases. However, when the capacity of the smoothing capacitor is reduced to reduce the size thereof, the capacity of the smoothing capacitor becomes more comparable to the induction component included in the direct-current power supply and wiring, so that the sharpness of the resonance is not mild. In other words, the value of the direct-current side voltage gain or the direct-current side current gain at the resonance frequency relatively increases, so that the amount of the difference between the resonance frequency and the frequency twice the switching frequency may be an issue. When the switching frequency is set as defined by the characteristic features of the present disclosure, the frequency greatly affecting the pulsation results in at least the frequency twice the frequency at which the value of the direct-current side voltage gain or the direct-current side current gain is equal to the value thereof at the frequency of zero (that is, the frequency sufficiently higher than the resonance frequency). As a result, even when the capacity of the smoothing capacitor is reduced, the distance between the resonance frequency and the frequency greatly affecting the pulsation (frequency twice the switching frequency) can be increased. As a result, the capacity of the smoothing capacitor can be reduced while reducing the fluctuation, such as the pulsation, of the voltage or the current on the direct-current side of the inverter.

As described above, of the R, L, and C components, the impedance components dependent on the frequency are the L component and the C component. Therefore, when the frequency is zero, the value of the direct-current side voltage gain only depends on the R component. In other words, when the frequency is zero, the value of the direct-current side voltage gain obtained by dividing the system voltage by the system current is the value of the internal resistance of the direct-current power supply. Hence, the switching frequency can be set based on the frequency characteristic of the direct-current side voltage gain obtained using the value of the internal resistance of the direct-current power supply. The internal resistance of the direct-current power supply changes with temperature, and has a larger value as the temperature is lower. As the temperature is lower, the value of the direct-current side voltage gain at the frequency of zero is larger, so that the frequency corresponding to the value of the gain is closer to the resonance frequency, but cannot be lower than the resonance frequency. Accordingly, this frequency is preferably set as a standard for the lowest limit of the switching frequency. Specifically, as an aspect of the present disclosure, the rotary electric machine driving device according to the present disclosure is preferable when the value of the direct-current side voltage gain at the frequency of zero is a value of a power supply internal resistance that is the internal resistance of the direct-current power supply, and the switching frequency is set based on the frequency characteristic of the direct-current side voltage gain obtained using the value of the power supply internal resistance at the minimum temperature in a predetermined operating temperature range of the rotary electric machine driving device.

The direct-current power supply, the smoothing capacitor, and the inverter are connected by conductors. Hence, the impedance on the direct-current power supply side of the inverter and the smoothing capacitor includes the impedance included in the conductors. In general, the impedance included in the conductors is smaller than the impedance of a power supply device serving as a core of the direct-current power supply, so that the switching frequency may be set based on the frequency characteristic of the direct-current side voltage gain that is obtained by taking only the impedance of the power supply device into account. However, to set the switching frequency more accurately, it is preferable to take the impedance of the conductors into account. As an aspect of the present disclosure, the rotary electric machine driving device according to the present disclosure is preferable when the power supply internal resistance is a sum of a battery resistance that is the internal resistance of the battery as the direct-current power supply and a wiring resistance that is the resistance of the wiring connecting the battery, the smoothing capacitor, and the inverter.

DETAILED DESCRIPTION OF THE EMBODIMENTS

Figure 1:
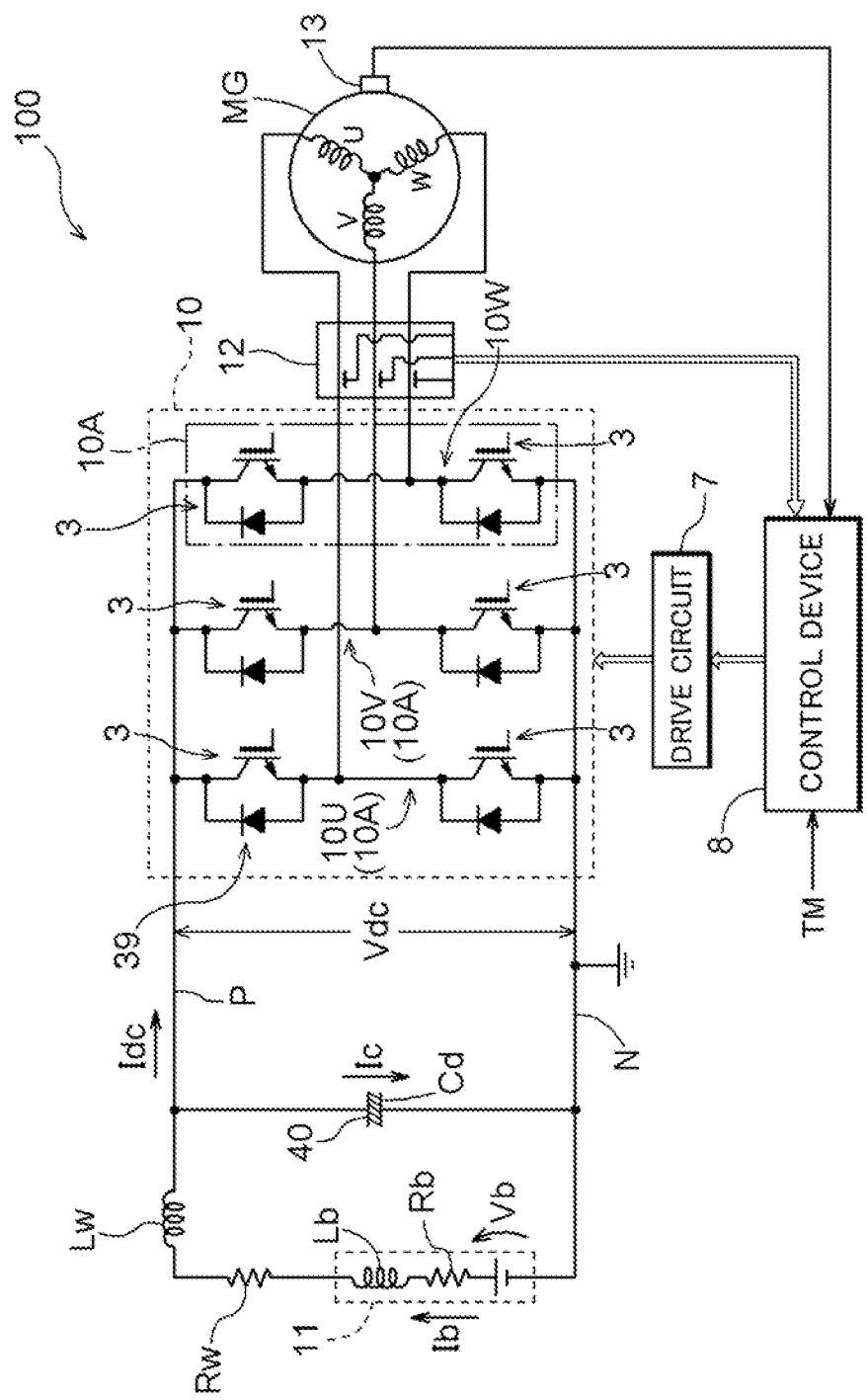
FIG. 1 is a block diagram schematically showing an example of a system structure of a rotary electric machine driving device.

Based on the drawings, an embodiment of the present disclosure is described by way of an example of a rotary electric machine driving device that controls a rotary electric machine MG serving as a source of driving force of a hybrid vehicle, an electric vehicle, or the like. A block diagram of FIG. 1 schematically shows a system structure of a rotary electric machine driving device 100. The rotary electric machine MG as the source of driving force of the vehicle is a rotary electric machine that operates with an alternating-current having a plurality of phases (here, three-phase alternating current), and can function as both an electric motor and an electric generator.

A vehicle, such as an automobile, which cannot be supplied with electric power from an overhead wire as in the case of a railway, is equipped with, as a source of power for driving the rotary electric machine, a direct-current power supply, including secondary cells (battery) such as nickel-hydrogen cells or lithium-ion cells, or electric double-layer capacitors. In the present embodiment, a battery 11 (high-voltage direct-current power supply) having a power supply voltage of, for example, 200 [V] to 400 [V] is provided as the high-voltage, large-capacity direct-current power supply for supplying the power to the rotary electric machine MG. The rotary electric machine MG is an alternating-current rotary electric machine, so that an inverter 10 for performing power conversion between the direct current and the alternating current is provided between the battery 11 and the rotary electric machine MG. A direct-current voltage between a positive power supply line P (high-voltage direct-current positive line) and a negative power supply line N (high-voltage direct-current negative line) on the direct-current side of the inverter 10 is called a "system voltage Vdc" where appropriate in the following description. The battery 11 can supply power to the rotary electric machine MG through the inverter 10, and can store power generated by the rotary electric machine MG and obtained therefrom. A smoothing capacitor 40 (direct-current link capacitor) for smoothing the direct-current voltage (system voltage Vdc) is provided between the inverter 10 and the battery 11. The smoothing capacitor 40 stabilizes the direct-current voltage that fluctuates in response to fluctuation in power consumption of the rotary electric machine MG.

The battery 11 includes a plurality of battery cells, and has an internal impedance including an internal resistance (resistance component) and an internal inductance (induction component). In the present embodiment, these are called a battery resistance Rb and a battery inductance Lb. The battery 11 is connected to the inverter 10 using, for example, metal wiring members called busbars. Such busbars also have a conductor impedance including a conductor resistance (resistance component) and a conductor inductance (induction component). That is, wiring connecting the battery 11, the smoothing capacitor 40, and the inverter 10 has a wiring impedance including a wiring resistance and a wiring inductance. In the present embodiment, these are called a wiring resistance Rw and a wiring inductance Lw.

Figure 2:
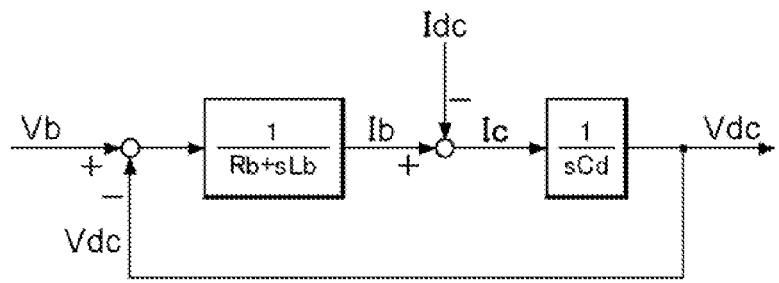
FIG. 2 is a block diagram showing a control model of a direct-current power supply unit.

Regarding the battery 11 side of the inverter 10, the internal resistance of the direct-current power supply unit including the wiring members such as the busbars (power supply internal resistance Rps) is the sum of the battery resistance Rb and the wiring resistance Rw. Also, the internal inductance of the direct-current power supply unit (power supply internal inductance Lps) is the sum of the battery inductance Lb and the wiring inductance Lw. In many cases, however, the battery resistance Rb is much larger than the wiring resistance Rw, and the battery inductance Lb is much larger than the wiring inductance Lw. Hence, in the following description, the battery resistance Rb is used as the power supply internal resistance Rps, and the battery inductance Lb is used as the power supply internal inductance Lps. A block diagram of FIG. 2 shows a control model representing, as the direct-current power supply unit, a relation between the voltage between terminals (battery voltage Vb) of the battery 11 and the system voltage Vdc.

The inverter 10 converts the direct-current power having the system voltage Vdc into the alternating-current power having a plurality of phases (n phases, where n is a natural number; here, three phases), and supplies the alternating-current power to the rotary electric machine MG. The inverter 10 also converts the alternating-current power generated by the rotary electric machine MG into the direct-current power, and supplies the direct-current power to the direct-current power supply. The inverter 10 includes a plurality of switching elements. A power semiconductor device, such as an insulated-gate bipolar transistor (IGBT) or a power metal-oxide-semiconductor field-effect transistor (MOSFET) is preferably employed as the switching element. Instead of such a silicon (Si) device, a silicon carbide (SiC) device, such as an SiC-MOSFET or an SiC static induction transistor (SiC-SIT), or a complex compound power device, such as a gallium nitride MOSFET (GaN-MOSFET), which can operate at high frequencies, may preferably be employed as the switching element. In the present embodiment, as an example, an IGBT 3 is used as the switching element, as shown in FIG. 1.

The inverter 10 for performing the power conversion between the direct current and the alternating current having a plurality of phases (here, three-phase alternating current) is formed by a bridge circuit that includes the number of arms corresponding to the number of the phases (here, three phases), as is well known. Specifically, as shown in FIG. 1, two of the IGBTs 3 are connected in series between the direct-current positive side (the positive power supply line P on the positive side of the direct-current power supply) of the inverter 10 and the direct-current negative side (the negative power supply line N on the negative side of the direct-current power supply) of the inverter 10 to form one arm 10A. The IGBT 3 connected to the positive power supply line P is called an upper-stage IGBT (an upper-stage switching element or a high-side switch), and the IGBT 3 connected to the negative power supply line N is called a lower-stage IGBT (negative-side switching element or low-side switch).

When the alternating current having a plurality of phases is the three-phase alternating current, three lines (for three phases 10U, 10V, and 10W) of such series circuits (10A for one arm) are connected in parallel with each other. Specifically, the bridge circuit is formed in which one set of series circuit (arm 10A) corresponds to a stator coil corresponding to each of the U-phase, the V-phase, and the W-phase of the rotary electric machine MG. In the upper-stage IGBT in each phase, the collector terminal is connected to the positive power supply line P, and the emitter terminal is connected to the collector terminal of the lower-stage IGBT in the same phase. The emitter terminal of the lower-stage IGBT in each phase is connected to the negative power supply line N. A midpoint of the series circuit (arm 10A) formed by a pair of IGBTs 3 in each of the phases, that is, a connection point between the upper-stage IGBT and the lower-stage IGBT in each of the phases is connected to the corresponding stator coil of the rotary electric machine MG. A free-wheel diode 39 (regenerative diode) is connected in parallel to each of the IGBTs 3. The free-wheel diode 39 is connected in parallel to each of the IGBTs 3 in a manner such that the cathode terminal of the free-wheel diode 39 is connected to the collector terminal of the IGBT 3, and the anode terminal of the free-wheel diode 39 is connected to the emitter terminal of the IGBT 3.

As shown in FIG. 1, the inverter 10 is controlled by a control device 8. The control device 8 includes an electronic control unit (ECU) that is built using a logical circuit, such as a microcomputer, as a core member. In the present embodiment, the ECU controls the rotary electric machine MG through the inverter 10 by executing current feedback control using a vector control method based on target torque TM of the rotary electric machine MG provided to the control device 8 as a request signal from, for example, another control device such as a vehicle ECU (not shown). The ECU of the control device 8 includes various functional units for the current feedback control, and the functional units are implemented through cooperation of hardware, such as the microcomputer, and software (programs).

An actual current flowing through the stator coil in each phase of the rotary electric machine MG is detected by a current sensor 12, and the control device 8 acquires the result of the detection. A rotation sensor 13 detects a magnetic pole position of a rotor of the rotary electric machine MG at each time, and the control device 8 acquires the result of the detection. The rotation sensor 13 is, for example, a resolver. The magnetic pole position represents a rotation angle of the rotor in terms of an electrical angle. The ECU of the control device 8 performs feedback control of the rotary electric machine MG based on the results of the detection by the current sensor 12 and the rotation sensor 13.

The vehicle is equipped with a low-voltage battery (low-voltage direct-current power supply) serving as a lower-voltage power supply than the battery 11, in addition to the battery 11 as the high-voltage direct-current power supply (not shown). The low-voltage battery has a power supply voltage of, for example, 12 V to 24 V, and supplies power to the control device 8 (ECU), electric components, such as an audio system, lighting equipment, interior lighting equipment, instrument illumination devices, and power windows, and control devices for controlling these electric components. The control device 8 includes, for example, a regulator circuit, and generates a power source suitable for operating the microcomputer and the like based on the power supplied from the low-voltage battery.

The gate terminal serving as the control terminal of each of the IGBTs 3 forming the inverter 10 is connected to the control device 8 (ECU) through a drive circuit 7, and is individually controlled to be switched. The high-voltage circuits for driving the rotary electric machine MG greatly differ in operating voltage (power supply voltage of the circuits) from the low-voltage circuits, such as the ECU having the microcomputer and the like as a core. For this reason, a control signal (switching control signal) for each of the IGBTs 3 generated by the control device 8 (ECU) serving as a low-voltage circuit is supplied to the corresponding IGBT 3 through the drive circuit 7, as a gate driving signal of a high-voltage circuit. The drive circuit 7 often includes an insulating element such as a photocoupler or a transformer.

As described above, the control device 8 includes the logical circuit, such as the microcomputer, serving as a core. In the present embodiment, the control device 8 formingthe microcomputer serving as a core which executes a rotary electric machine driving program. The microcomputer includes a CPU core, a program memory, a parameter memory, a work memory, a timer, and ports. The CPU core is a core of the microcomputer, and includes an instruction register, an instruction decoder, an arithmetic logic unit (ALU) serving as the main execution body of various operations, flag registers, general-purpose registers, and an interrupt controller. In the present embodiment, while a configuration is illustrated in which the microcomputer is one semiconductor chip, a configuration can be obviously adopted in which a microcomputer unit is a combination of a plurality of components.

The program memory is a nonvolatile memory storing the rotary electric machine driving program. The parameter memory is a nonvolatile memory storing various parameters that are referred to when the program is executed. The parameter memory may be formed without being distinguished from the program memory. The program memory and the parameter memory are preferably formed of, for example, a flash memory. The work memory is a memory for temporarily storing temporary data while the program is running. The work memory may be volatile, and is formed of a dynamic RAM (DRAM) or a static RAM (SRAM) that allows quick data reading and writing.

The timer measures time using the clock cycle of the microcomputer as the minimum resolution. The timer monitors, for example, the execution period of the program. The timer also measures the effective time of the switching control signal for driving the IGBT 3 of the inverter 10, and generates the switching control signal. The timer also manages control periods predefined by the program or parameters, such as the period (basic control period) of executing one loop of the current feedback control and the output period (switching period Tc) of the switching control signal. The ports serve as a terminal control unit that outputs, for example, the switching control signal for the IGBT 3 of the inverter 10 through a terminal of the microcomputer, and receives the rotation detection signal which is supplied from the rotation sensor 13 and is input to the microcomputer and the current detection signal from the current sensor 12.

Figure 3:
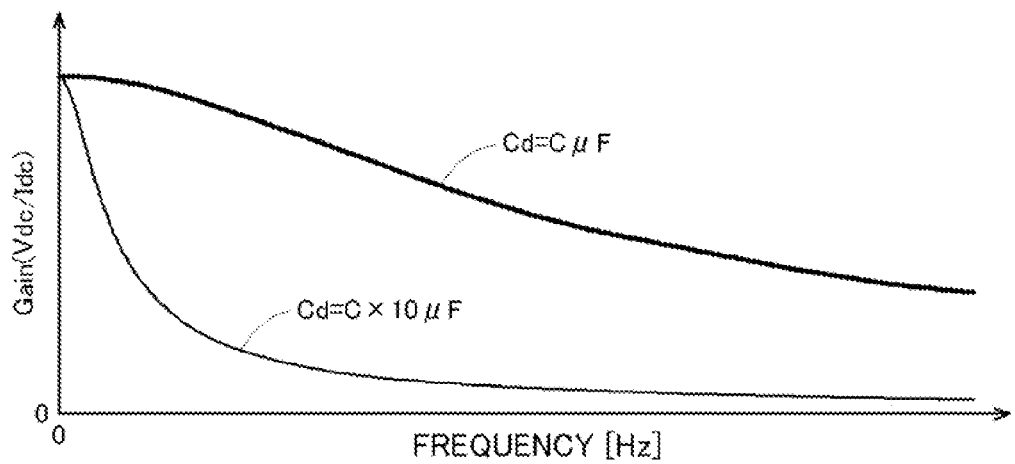
FIG. 3 shows a frequency characteristic of a gain when only a resistance component is taken into account.
Figure 4:
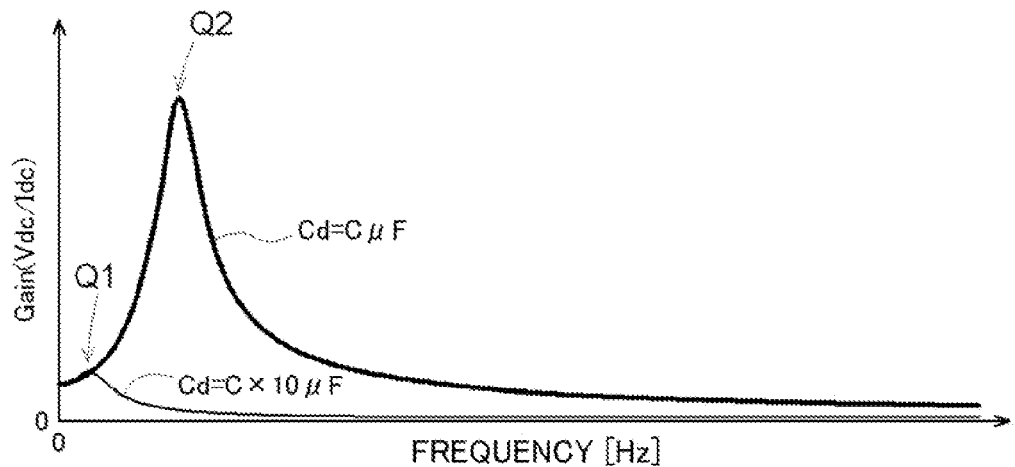
FIG. 4 shows the frequency characteristic of the gain when the resistance component and an induction component are taken into account.

As shown in FIG. 2, the transfer function for the control model of the battery 11 serving as the direct-current power supply unit includes the battery inductance Lb and the capacitance (direct-current link capacitance Cd) of the smoothing capacitor 40 as impedance components which are dependent on the frequency. As a result, the system voltage Vdc is a function of frequency. Each of FIGS. 3 and 4 shows a frequency characteristic of a gain (direct-current side voltage gain) defined by the system voltage Vdc and a system current Idc flowing through the inverter 10. When the battery inductance Lb is not taken into account, the gain (direct-current side voltage gain) of the system voltage Vdc relative to the system current Idc is defined by formula (1), and exhibits the frequency characteristic shown in FIG. 3. When the battery inductance Lb is taken into account, the direct-current side voltage gain is defined by formula (2), and exhibits the frequency characteristic shown in FIG. 4.

[Formula 1]

$$\text{Gain(DC link voltage)} = \frac{Vdc}{Idc} = \frac{Rb}{\sqrt{1 + \omega^2 \cdot Cd^2 \cdot Rb^2}} \quad (1)$$

[Formula 2]

$$\text{Gain(DC link voltage)} = \frac{Vdc}{Idc} = \frac{\sqrt{Rb^2 + (\omega \cdot Lb)^2}}{\sqrt{(1 - \omega^2 \cdot Cd \cdot Lb)^2 + (\omega \cdot Rb \cdot Cd)^2}} \quad (2)$$

As understood from formulae (1) and (2) and FIGS. 3 and 4, the direct-current side voltage gain is smaller as the capacitance (direct-current link capacitance Cd) of the smoothing capacitor 40 is larger. In other words, reducing the capacity of the smoothing capacitor 40 to reduce the size of the smoothing capacitor 40 increases the direct-current side voltage gain, and thus reduces an effect of suppressing pulsation of the system voltage Vdc. In addition, as is clear from the comparison between FIGS. 3 and 4, when the battery inductance Lb is taken into account as the impedance of the direct-current power supply unit, resonance occurs between the battery inductance Lb and the direct-current link capacitance Cd. This resonance also needs to be taken into account. In other words, when the battery inductance Lb is not taken into account as the impedance of the direct-current power supply unit, merely reducing the capacity of the smoothing capacitor 40 simply results in a higher direct-current side voltage gain. In contrast, when the battery inductance Lb is taken into account, the resonance greatly increases the direct-current side voltage gain at a certain frequency. As illustrated in FIG. 4, the value of the gain at a resonance point (Q2) when the direct-current link capacitance Cd is C [µF] is much larger than the value of the gain at a resonance point (Q1) when the direct-current link capacitance Cd is 10 times C.

Figure 5:
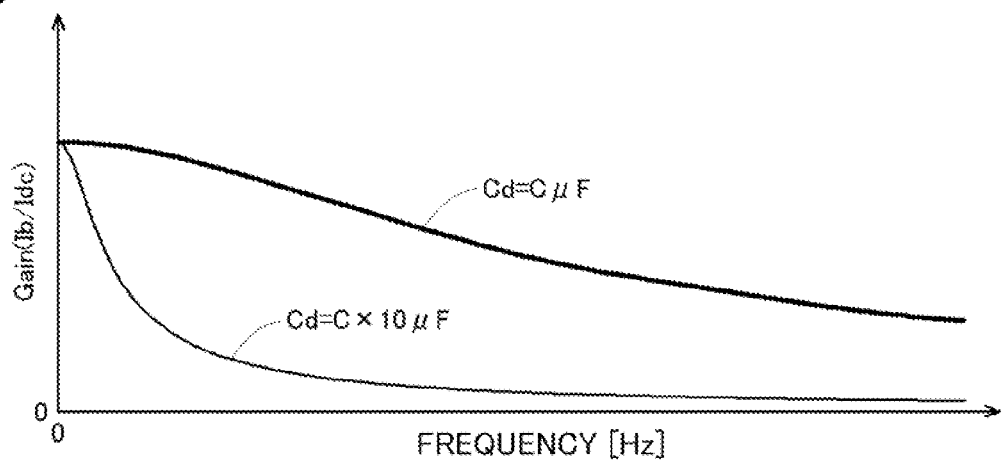
FIG. 5 shows a frequency characteristic of a gain when only the resistance component is taken into account.
Figure 6:
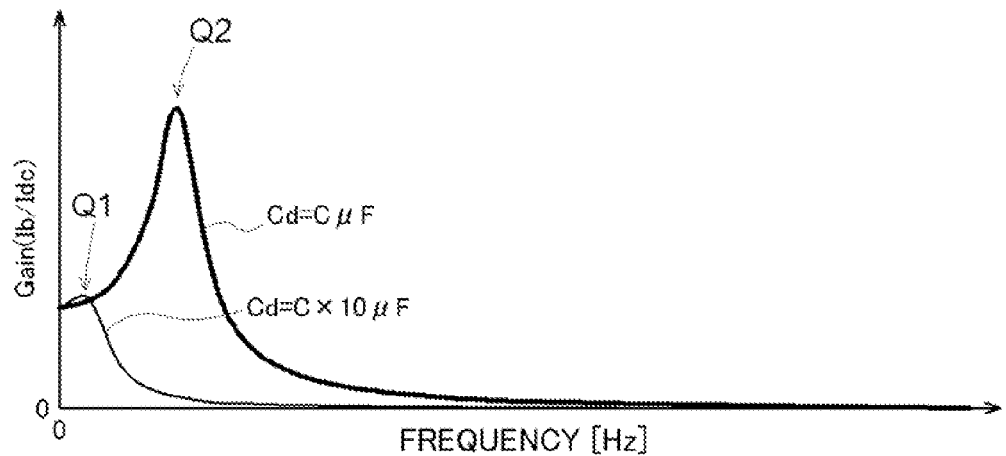
FIG. 6 shows the frequency characteristic of the gain when the resistance component and the induction component are taken into account.

The gain of a battery current Ib relative to the system current Ide (battery current gain) is also a function of frequency. Each of FIGS. 5 and 6 shows a frequency characteristic of the gain (battery current gain) defined by the battery current Ib and the system current Ide flowing through the inverter 10. When the battery inductance Lb is not taken into account, the battery current gain is defined by formula (3), and exhibits the frequency characteristic shown in FIG. 5. When the battery inductance Lb is taken into account, the battery current gain is defined by formula (4), and exhibits the frequency characteristic shown in FIG. 6. The battery current Ib corresponds to a current of the direct-current power supply of the present disclosure, and the battery current gain corresponds to a direct-current side current gain of the present disclosure.

[Formula 3]

$$\text{Gain(battery current)} = \frac{Ib}{Idc} = \frac{1}{\sqrt{1 + \omega^2 \cdot Cd^2 \cdot Rb^2}} \quad (3)$$

[Formula 4]

$$\text{Gain(battery current)} = \frac{Ib}{Idc} = \frac{1}{\sqrt{(1 - \omega^2 Cd \cdot Lb)^2 + (\omega \cdot Rb \cdot Cd)^2}} \quad (4)$$

As understood from formulae (3) and (4) and FIGS. 5 and 6, the battery current gain is smaller as the capacitance (direct-current link capacitance Cd) of the smoothing capacitor 40 is larger. In other words, reducing the capacity of the smoothing capacitor 40 to reduce the size of the smoothing capacitor 40 increases the gain, and thus reduces an effect of suppressing pulsation generated in the battery current Ib. In addition, as is clear from the comparison between FIGS. 5 and 6, when the battery inductance Lb is taken into account as the impedance of the direct-current power supply unit, resonance occurs between the battery inductance Lb and the direct-current link capacitance Cd. This resonance also needs to be taken into account. In other words, when the battery inductance Lb is not taken into account as the impedance of the direct-current power supply unit, merely reducing the capacity of the smoothing capacitor 40 simply results in a higher battery current gain. In contrast, when the battery inductance Lb is taken into account, the resonance greatly increases the battery current gain at a certain frequency. As illustrated in FIG. 6, the value of the gain at the resonance point (Q2) when the direct-current link capacitance Cd is C [μF] is much larger than the value of the gain at the resonance point (Q1) when the direct-current link capacitance Cd is 10 times C.

The pulsations of the system voltage Vdc and the battery current Ib occur in association with fluctuation in current and voltage associated with the switching of the IGBT 3 of the inverter 10. In other words, the pulsations of the system voltage Vdc and the battery current Ib occur corresponding to a switching frequency fc (reciprocal of the switching period Tc) of the IGBT 3. For example, it is known that pulsation having a frequency component of "2fc" (ripple frequency), which is twice the switching frequency fc, occurs. If the frequency of the resonance ("frp" to be described later) between the direct-current link capacitance Cd and the battery inductance Lb is close to the ripple frequency "2fc", the value of the direct-current side voltage gain is large, so that the pulsation is large. The resonance frequency frp is determined by the hardware structure of the rotary electric machine driving device 100, including the battery 11. Accordingly, it is preferable that the switching frequency fc is appropriately set so as to move the ripple frequency "2fc" away from the resonance frequency frp within a range in which the control device 8 can perform control. The following describes a method for setting the switching frequency fc in that manner (specifically, a method for setting a lower limit frequency fmin of the switching frequency fc).

Figure 7:
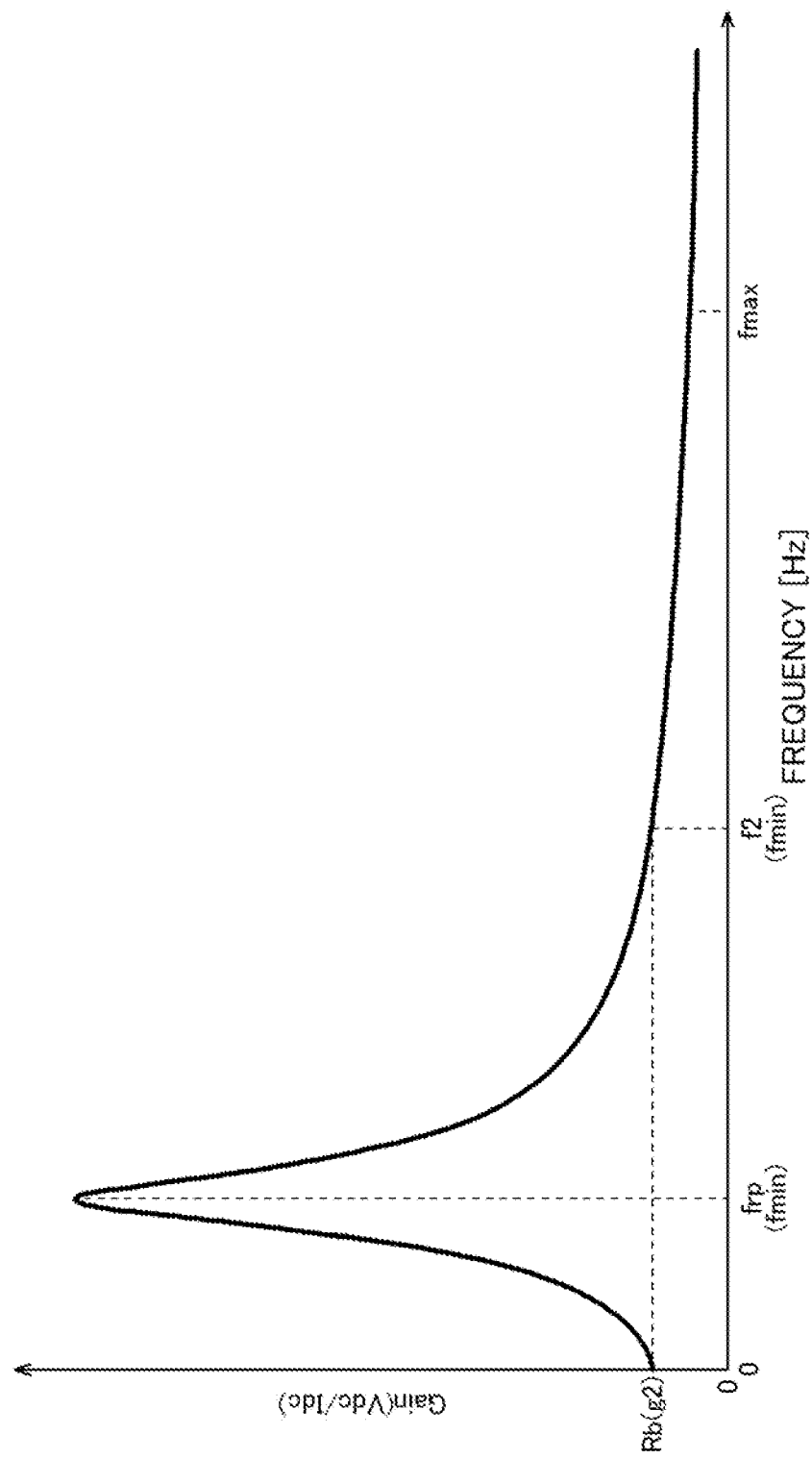
FIG. 7 is a diagram showing a relation between the frequency characteristic of the gain and a switching frequency.

FIG. 7 shows a simulation result of the direct-current side voltage gain when the direct-current link capacitance Cd is C [μF], the battery inductance Lb is L1 [μH], and the battery resistance Rb is g2 [Ω]. As shown in FIG. 7, a resonance peak appears at the resonance frequency frp. The resonance frequency frp is obtained by formula (5).

[Formula 5]

$$frp = \frac{1}{2\pi} \sqrt{\frac{1}{Cd \cdot Lb}} \quad (5)$$

As described above, the pulsation of the system voltage Vdc occurs at the ripple frequency "2fc", which is twice the switching frequency fc of the inverter 10. As the ripple frequency "2fc" is closer to the resonance frequency frp, the pulsation of the system voltage Vdc is larger, and the pulsation of the battery current Ib is also larger. The pulsation of the battery current Ib reduces the durability (lifetime) of the battery 11. In the example shown in FIG. 7, if the switching frequency fc of the switching control signal is substantially half the resonance frequency frp, the ripple frequency "2fc" is substantially equal to the resonance frequency frp, so that the ripple frequency 2fc is equal or close to the resonance frequency frp, and thus, the pulsation increases. For this reason, the switching frequency fc serving as the cause of the ripple frequency 2fc is preferably moved away from the resonance frequency frp.

In the frequency characteristic shown in FIG. 7, when the switching frequency fc is moved away from the resonance frequency frp, the switching frequency fc can be moved toward either the lower side or the higher side. However, moving the switching frequency fc toward the lower side reduces the resolution of the switching control of the inverter 10, and may thus reduce the smoothness of rotation control of the rotary electric machine MG. Hence, the switching frequency fc is preferably adjusted toward a higher frequency. As an embodiment, the switching frequency fc is preferably set to a frequency higher than a frequency at which the value of the direct-current side voltage gain is maximum. As is clear from FIG. 7, the value of the direct-current side voltage gain is maximum at the resonance frequency frp. When the switching frequency fc is set to a frequency higher than the resonance frequency frp, the frequency twice the switching frequency fc is adjusted toward a higher frequency relative to the resonance frequency frp. Specifically, the lower limit frequency fmin of the switching frequency fc results in the resonance frequency frp, in this case.

As an embodiment, the lower limit frequency fmin of the switching frequency fc may preferably be set to a frequency (f2) at which the value of the direct-current side voltage gain is equal to the gain at a frequency of "0". As is clear from FIG. 7 and the like, the value of the direct-current side voltage gain increases as the frequency increases from zero, reaches the maximum value (resonance point) at the resonance frequency frp, and decreases as the frequency increases from the resonance point serving as an inflection point. Therefore, the frequency equal to or higher than the frequency at which the value of the direct-current side voltage gain reaches the value thereof at the frequency of zero is higher than the resonance frequency frp. The frequency (2fc) twice the switching frequency fc is a still higher frequency, and is therefore still away from the resonance frequency frp. As a result, the pulsations of the system voltage and the system current can further be kept from increasing. In particular, when the resonance frequency frp is lower, the distance between the resonance frequency frp and the frequency (2fc) twice the switching frequency fc can be more increased than in the case in which the switching frequency fc is set close to the resonance frequency frp. As is clear from formula (2) given above, the value of the gain at the frequency of "0" is the "battery resistance Rb (power supply internal resistance Rps)=g2". In this case, the lower limit frequency fmin is represented by formula (6).

[Formula 6]

$$f\min = \frac{1}{2\pi}\sqrt{\frac{Lb^2 + 2 \cdot Cd \cdot Lb - Rb^2 \cdot Cd^2}{Rb^2 \cdot Cd^2 \cdot Lb^2}} \quad (6)$$

If the switching frequency fc is set to a frequency higher than the resonance frequency frp and equal to or lower than "f2", the value of the gain at the frequency (2fc) twice the switching frequency fc is larger, but the sixth-order harmonic component of the rotational frequency of the rotary electric machine MG to be described later is smaller, so that the lower limit frequency fmin of the switching frequency fc can be set based on a tradeoff between the gain and the sixth-order harmonic component. If the lower limit frequency fmin of the switching frequency fc is set equal to or higher than "f2", the sixth-order harmonic component of the rotational frequency of the rotary electric machine MG is larger, but the value of the gain at the frequency (2fc) twice the switching frequency fc is smaller, which is preferable.

It is also preferable to set the upper limit frequency fmax of the switching frequency fc. As the switching frequency fc increases, the number of switching per unit time increases, so that the switching loss in the inverter 10 also increases. Hence, it is preferable to define conditions for the upper limit frequency fmax, in addition to those for the lower limit frequency fmin. The conditions will be described later.

Figure 8:
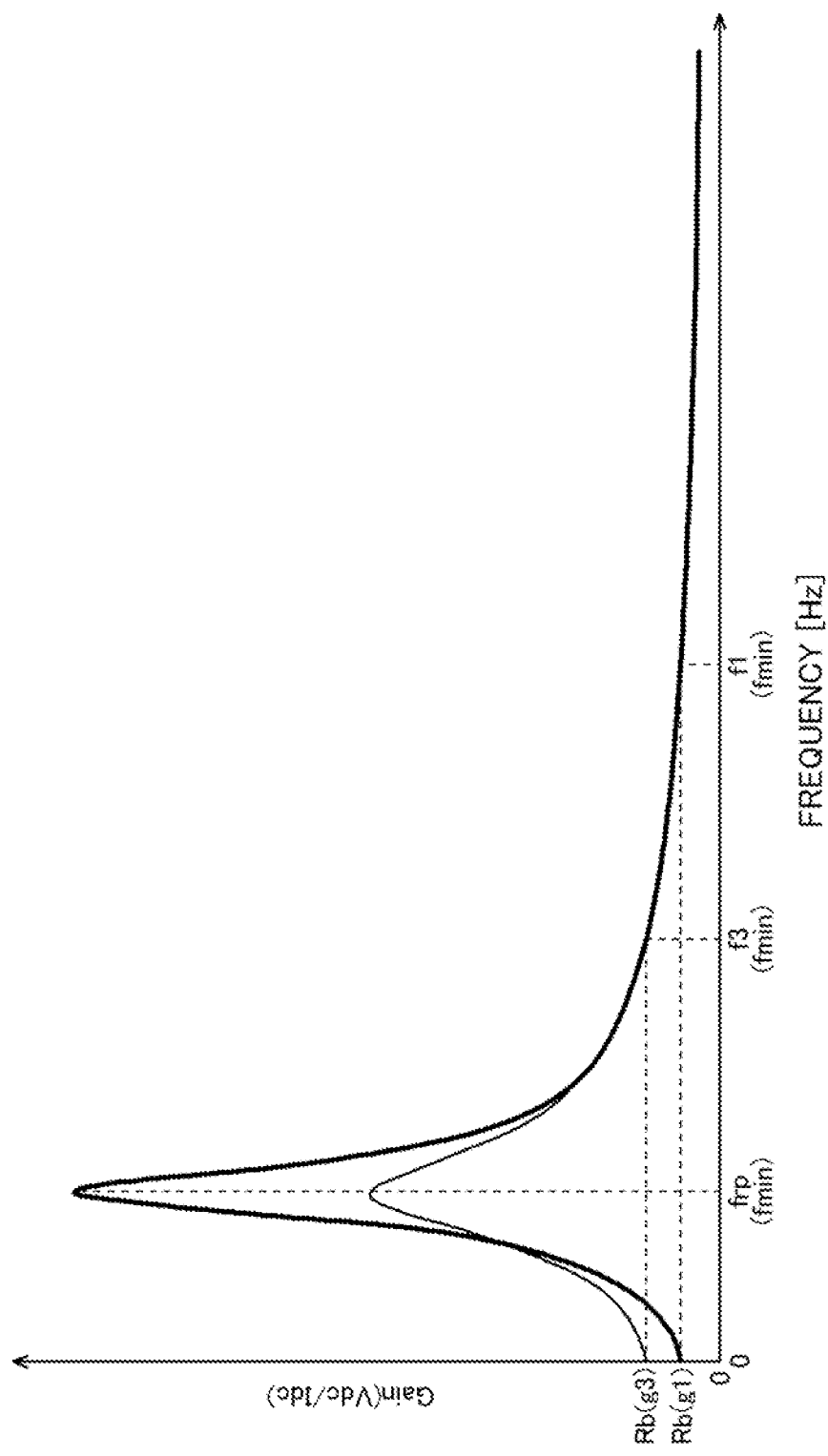
FIG. 8 is a diagram showing a condition to determine the switching frequency by taking an operating temperature into account.

The battery resistance Rb changes depending on the operating temperature of the battery 11 (operating temperature of the rotary electric machine driving device 100). As a result, the lower limit frequency fmin also changes on the temperature. FIG. 8 shows simulation results of the frequency characteristic of the direct-current side voltage gain at the maximum temperature (such as 60[° C.]) and the minimum temperature (such as −40[° C.]) in an operating temperature range. The thick line in FIG. 8 indicates the frequency characteristic at the maximum temperature, and the thin line indicates the frequency characteristic at the minimum temperature, in the operating temperature range. In the present embodiment, the battery resistance Rb is g1 [Ω] at the maximum temperature and g3 [Ω] at the minimum temperature, where "g3 >g1".

As described above, the value of the direct-current side voltage gain at the frequency of "0" is equal to the battery resistance Rb. The battery resistance Rb tends to increase as the operating temperature drops, so that the battery resistance Rh has the largest value at the minimum temperature in the operating temperature range. Accordingly, the switching frequency fc is preferably set based on the frequency characteristic of the direct-current side voltage gain obtained using the value of the battery resistance Rb (power supply internal resistance Rps) at the minimum temperature in the operating temperature range of the rotary electric machine driving device 100. In this case, the lower limit frequency fmin of the switching frequency fc is set to a frequency "f3" based on at least the frequency characteristic at the minimum temperature, so that the switching frequency fc is appropriately set without being set to an excessively high frequency. Naturally, this does not exclude a case in which the lower limit frequency fmin of the switching frequency fc is set to a frequency "f1" based on the frequency characteristic at the maximum temperature as a result of taking reliability into account. Also, a case is not excluded in which the lower limit frequency fmin is set to a frequency "f2" obtained based on the frequency characteristic at normal temperature (20° C. to 25° C.), for example, as shown in FIG. 7.

Considering vehicles equipped with the rotary electric machine driving device 100, the supplier of the battery 11, the supplier of the IGBT 3 of the inverter 10, and the supplier of the control device 8 may differ from vehicle to vehicle. Specifically, the control device 8 can preferably set an appropriate value of the switching frequency fc when the battery resistance Rb, the battery inductance Lb, the withstand voltage of the IGBT 3, and the like vary depending on the vehicle. As described above, according to the present disclosure, the switching frequency fc can be set based on the frequency characteristic of the direct-current side voltage gain, and the technique of the present disclosure can be widely applied.

Figure 9:
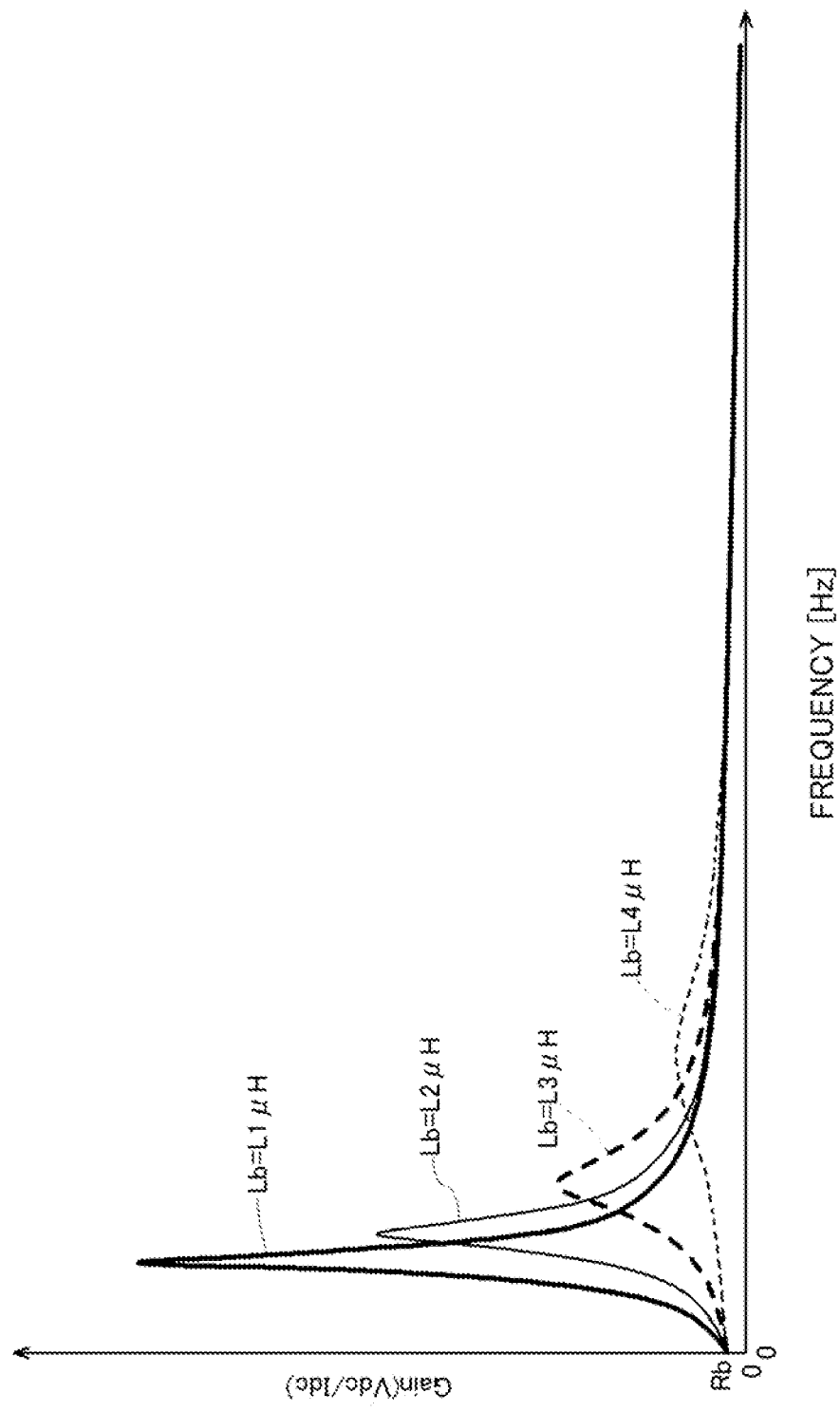
FIG. 9 is a waveform diagram showing variations in the frequency characteristic of the gain according to the induction component.

FIG. 9 shows simulation results of the direct-current side voltage gain obtained by varying the battery inductance Lb while the battery resistance Rb is kept constant. Here, it is assumed to be "L1>L2>L3>L4". In all of the cases, the switching frequency fc can be appropriately set on the high-frequency side over the resonance point. In this manner, the present disclosure can provide the technique that has low dependency on the hardware structure of the rotary electric machine driving device 100 and that can be widely applied.

As described above, the control device 8 executes, for example, one loop of the current feedback control in one basic control period managed by the timer. If the switching period Tc (=1/fc) is shorter than the basic control period, several switching control signals are output while the current feedback control is not followed, resulting in a lower resolution of the control. As a result, due to the hardware structure of the motor and the hardware structure of the inverter, the harmonic components, particularly the sixth-order harmonic component, of the rotational frequency of the rotary electric machine MG is likely to be superposed on the system voltage Vdc. If the sixth-order harmonic component has a frequency which is close to the resonance point (Q2) illustrated in FIG. 6, the sixth-order harmonic component with extremely large amplitude is superposed on the system voltage Vdc. As a result, the pulsation of the battery current Ib increases, which may accelerate the deterioration of the battery 11.

To reduce the sixth-order harmonic component described above, a method is used in which the resolution of the control is maintained by reducing the basic control period as the switching period Tc is reduced (as the switching frequency fc increases). The following description will be made using numerical values as rough assumptions for facilitating understanding. The numerical values are, however, neither for limiting the disclosure, nor for illustrating specific examples. Suppose, for example, that the basic control period is 100 [μs] when the switching period Tc is 200 [μs] (the switching frequency fc is 5 [kHz]). If the switching period Tc is reduced by ⅛ to 25 [μs] (fc 40 [kHz]), the problem caused by the sixth-order harmonic component can be reduced by also reducing the basic control period by ⅛ to 12.5 [μs].

However, specified processing, such as one loop of the current feedback control, needs to be executed within the time of the basic control period. Therefore, whether or not the basic control period can be reduced depends on, for example, the processing capacity of the microcomputer serving as a core of the control device 8. If the processing capacity is insufficient, a high-performance microcomputer capable of high-speed processing needs to be used, or a plurality of microcomputers need to be used to perform parallel processing. Thus, the cost of the control device 8 increases. Hence, the basic control period is preferably reduced within an appropriate range. As an embodiment, the basic control period is preferably set between the same period as the switching period Tc and a period which is four times the switching period Te. In the example described above, the basic control period is set in the range from 12.5 [μs] to 50 [μs].

Figure 10B:
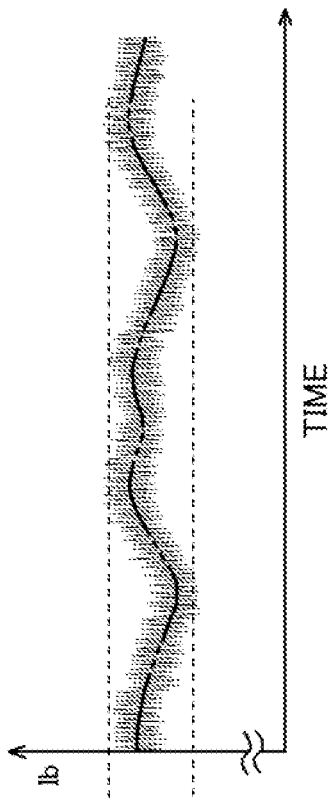
FIG. 10 shows waveform diagrams that compare different pulsations of a system current due to differences in a control period.
Figure 10A:
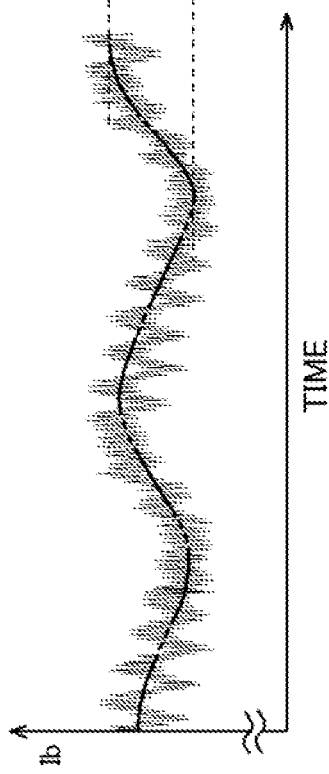

FIG. 10 shows waveforms of the battery current Ib obtained by performing simulations with different basic control periods. In FIG. 10, thick chain double-dashed lines indicate the pulsations (sixth-order harmonic components) of the battery current Ib occurring when the switching period Tc is set to 25 [μs] at a rotating speed at which the sixth-order harmonic components were not markedly observed when the switching period Tc was 200 [μs] and the basic control period was 100 [μs], as relative rough assumptions. FIG. 10A shows a case in which the basic control period remains at 100 [μs], and FIG. 10B shows a case in which the basic control period has been changed to 50 [μs]. As is clear from the comparison between FIGS. 10A and 10B, reducing the basic control period reduces the amplitude of the pulsation of the battery current Ib. In these simulations, the basic control period is set to four times the switching period Tc. The simulations show that the effect of reducing the pulsation generated in the battery current Ib can be obtained by setting the basic control period to such a value.

For practical purposes, the basic control period is preferably set so that the pulsation of the battery current Ib falls at or below the upper limit amplitude that is set by taking the deterioration of the battery 11 and the like into account. The basic control period needs to be shorter as the switching period Tc is shorter (as the switching frequency fc is higher). Hence, the basic control period is preferably taken into consideration when the switching period Tc is set. As described above, the criteria for setting the switching frequency fc using the frequency characteristics of the direct-current side voltage gain. These criteria are extremely useful as quantitative criteria. However, conceptually, the switching frequency fc is preferably set so as to satisfy the following criteria. The basic control period is also preferably set so as to satisfy the following criteria.

Specifically, the switching frequency fc is preferably set so as to satisfy both:

(a1) that the pulsation (pulsation at 2fc) of the system voltage Vdc generated corresponding to the switching frequency fc falls within a range in which the IGBTs 3 (switching elements) of the inverter 10 can be protected; and (a2) that the pulsation (pulsation at 2fc) of the battery current Ib generated corresponding to the switching frequency fc falls within a range in which the battery 11 can be protected.

The basic control period is preferably set so as to satisfy both:

(b1) that the pulsation of the system voltage Vdc based on the sixth-order harmonic component generated corresponding to the rotating speed of the rotary electric machine MG falls within a range in which the IGBTs 3 (switching elements) of the inverter 10 can be protected; and (b2) that the pulsation of the battery current Ib based on the sixth-order harmonic component falls within a range in which the battery 11 can be protected.

As an embodiment, the lower limit frequency fmin of the switching frequency fc described above may be set using at least one of the frequency characteristics of the direct-current side voltage gain and the battery current gain, and the upper limit frequency fmax of the switching frequency fc may be set based on (a1) and (a2) described above. The upper limit frequency fmax may be set to a frequency at which the switching loss of the inverter 10 falls at or below a predefined upper limit loss, based on (a1) and (a2) described above.

The method for setting the switching frequency fc using the frequency characteristic of the direct-current side voltage gain has been specifically described. In view of (a1) and (a2) described above and (b1) and (b2) described above, however, it is easily understood that the setting conditions of the switching frequency fc can be defined using the frequency characteristic of the battery current gain (direct-current side current gain) instead of the frequency characteristic of the direct-current side voltage gain. It is also easily understood that the setting conditions of the switching frequency fc can be defined based on both the frequency characteristic of the direct-current side voltage gain and the battery current gain. In principle, the setting conditions of the switching frequency fc using the frequency characteristic of the battery current gain are equivalent to the setting conditions of the switching frequency fc using the frequency characteristic of the direct-current side voltage gain, so that the setting conditions of the switching frequency fc using the frequency characteristic of the battery current gain is briefly described below. The setting conditions of the switching frequency fc based on both the frequency characteristic of the direct-current side voltage gain and the battery current gain can be easily understood, so that details thereof will not be described.

Figure 11:
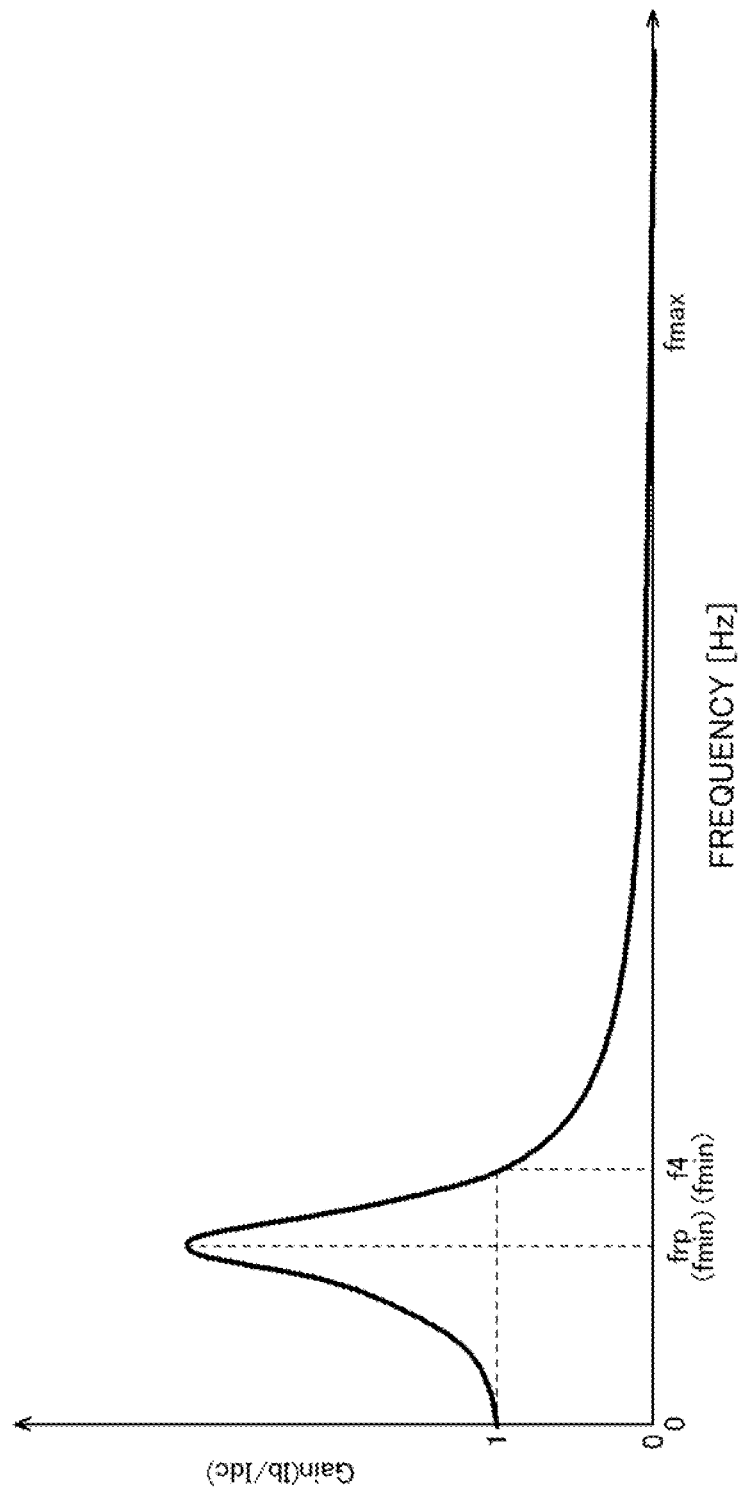
FIG. 11 is a diagram showing a relation between the frequency characteristic of the gain and the switching frequency.

FIG. 11 shows, in the same manner as FIG. 7, a simulation result of the battery current gain when the direct-current link capacitance Cd is C [μF], the battery inductance Lb is L1 [μH], and the battery resistance Rb is g2 [Ω]. As shown in FIG. 11, a resonance peak appears at the resonance frequency frp.

In the same manner as in the case of the system voltage Vdc, the pulsation of the battery current Ib occurs at the ripple frequency "2fc", which is twice the switching frequency fc of the inverter 10. The pulsation of the battery current Ib is larger as the ripple frequency "2fc" is closer to the resonance frequency frp. In the example shown in FIG. 11, if the switching frequency fc of the switching control signal is substantially half the resonance frequency frp, the ripple frequency "2fc" is substantially equal to the resonance frequency frp, so that the ripple frequency 2fc is equal or close to the resonance frequency frp, and thus, the pulsation increases. For this reason, the switching frequency fc serving as the cause of the ripple frequency 2fc is preferably moved away from the resonance frequency frp.

As described with reference to FIG. 7, the switching frequency fe is preferably adjusted toward a higher frequency. As an embodiment, the switching frequency fc is preferably set to a frequency higher than a frequency at which the battery current gain is maximum. As is clear from FIG. 11, the value of the battery current gain is maximum at the resonance frequency frp. When the switching frequency fc is set to a frequency higher than the resonance frequency frp, the frequency twice the switching frequency fc is adjusted toward a higher frequency relative to the resonance frequency frp. Specifically, the lower limit frequency fmin of the switching frequency fc results in the resonance frequency frp, in this case.

As an embodiment, the lower limit frequency fmin of the switching frequency fc may preferably be set to a frequency (f4) at which the value of the direct-current side voltage gain is equal to the gain at the frequency of "0". As is clear from, for example, FIG. 11, the frequency equal to or higher than the frequency at which the value of the battery current gain reaches the value thereof at the frequency of zero is higher than the resonance frequency frp. The frequency (2fc) twice the switching frequency fc is a still higher frequency, and is therefore still away from the resonance frequency frp. In particular, when the resonance frequency frp is lower, the distance between the resonance frequency frp and the frequency (2fc) twice the switching frequency fc can be more increased than in the case in which the switching frequency fc is set close to the resonance frequency frp. As is clear from formula (4), the value of the gain at the frequency of "0" is "1".

Figure 12:
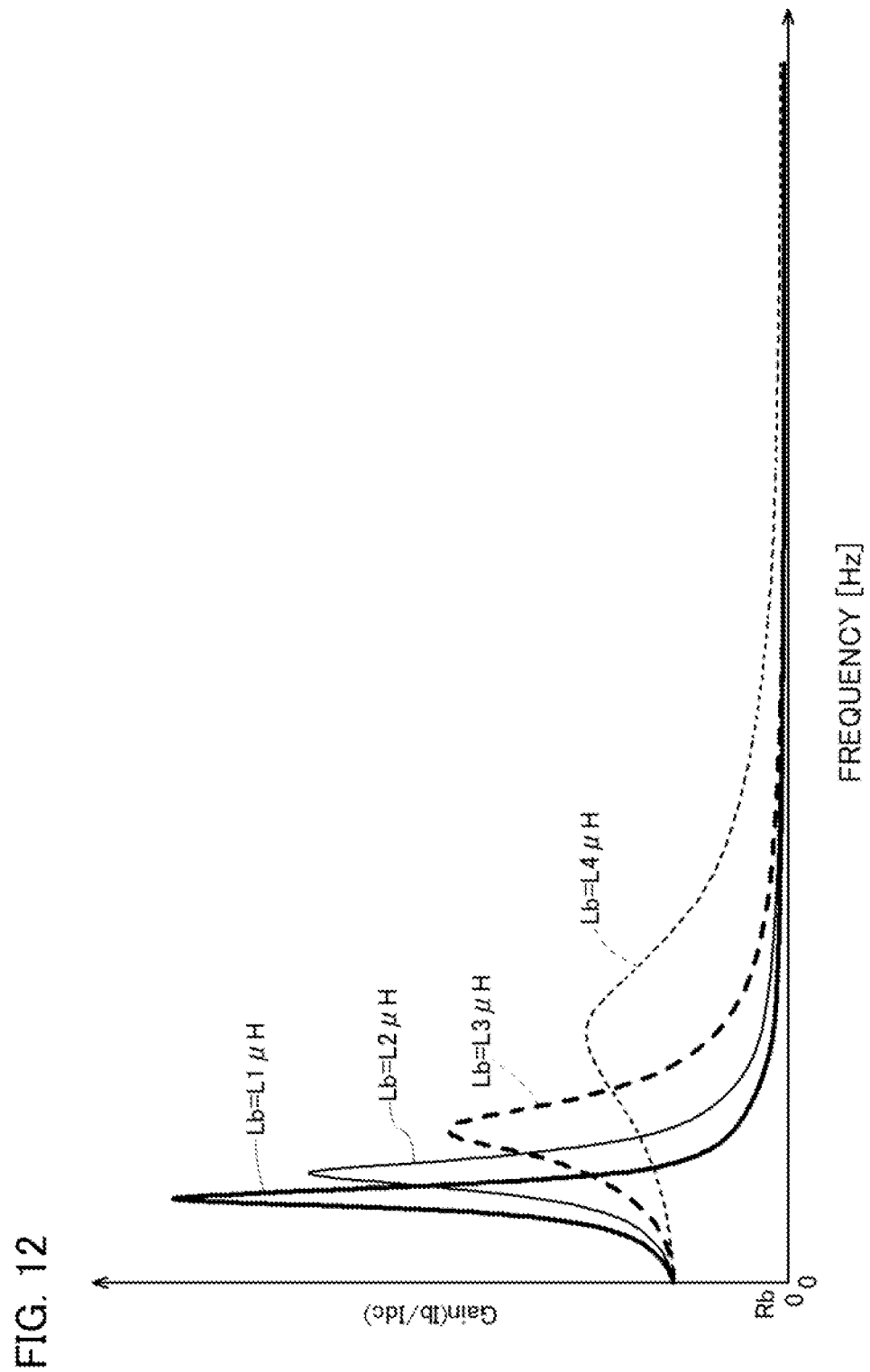
FIG. 12 is a waveform diagram showing variations in the frequency characteristic of the gain according to the induction component.

FIG. 12 shows, in the same manner as FIG. 9, simulation results of the battery current gain obtained by varying the battery inductance Lb while keeping the battery resistance Rb constant. In the same manner as in the case of FIG. 9, it is assumed to be "L1>L2>L3>L4". In all the cases, the switching frequency fc can be appropriately set on the high-frequency side over the resonance point.

In the embodiment described above, as an example, the IGBTs 3 are used as the switching elements, but the configuration of the present disclosure is also highly suitable for a case in which the SiC devices, such as the SiC-MOSFETs or the SiC-SITS, are used as the switching elements. That is, the SiC devices have characteristics of a smaller switching loss, which is more stably operable at high temperatures than the Si devices. For this reason, when the switching frequency is set higher by applying the configuration of the present disclosure, the SiC devices as described above are particularly preferably used as the switching elements.

The present disclosure can be widely applied to rotary electric machine driving devices that are designed based on the concept described above. Those skilled in the art will be able to easily understand that appropriate modifications can be made based on the specific embodiment described above within the scope not departing from the object of the present disclosure. Accordingly, the present disclosure also naturally includes other embodiments modified within the scope not departing from the object of the present disclosure.

INDUSTRIAL APPLICABILITY

The present disclosure can be applied to a rotary electric machine driving device that drives and controls an alternating-current rotary electric machine.

The invention claimed is:

1. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter; and
an inverter control unit that controls switching of a switching element of the inverter according to a predefined switching frequency, wherein
a value of a direct-current side voltage gain obtained by dividing a system voltage that is a voltage on the direct-current side of the inverter by a system current that is a current on the direct-current side of the inverter includes a frequency characteristic in which the value of the direct-current side voltage gain increases as the frequency increases from zero, reaches a maximum value at a resonance point at which the frequency becomes a resonance frequency, and decreases as the frequency increases from the resonance point serving as an inflection point, and
the inverter control unit sets the switching frequency to a frequency that is equal to or higher than the resonance frequency and that is equal to or higher than a frequency at which the value of the direct-current side voltage gain is equal to a value thereof at a frequency of zero in the frequency characteristic.

2. The rotary electric machine driving device according to claim 1, wherein
the value of the direct-current side voltage gain at the frequency of zero is a value of a power supply internal resistance that is the internal resistance of the direct-current power supply, and
the switching frequency is set based on the frequency characteristic of the direct-current side voltage gain obtained using the value of the power supply internal resistance at the minimum temperature in a predetermined operating temperature range of the rotary electric machine driving device.

3. The rotary electric machine driving device according to claim 2, wherein
the power supply internal resistance is a sum of a battery resistance that is the internal resistance of the battery as the direct-current power supply and a wiring resistance that is the resistance of the wiring connecting the battery, the smoothing capacitor, and the inverter.

4. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter; and
an inverter control unit that controls switching of a switching element of the inverter according to a predefined switching frequency, wherein
a value of a direct-current side current gain obtained by dividing a current of the direct-current power supply by a system current that is a current on the direct-current side of the inverter includes a frequency characteristic in which the value of the direct-current side current gain increases as the frequency increases from zero, reaches a maximum value at a resonance point at which the frequency becomes a resonance frequency, and decreases as the frequency increases from the resonance point serving as an inflection point, and the inverter control unit sets the switching frequency to a frequency that is equal to or higher than the resonance frequency and that is equal to or higher than a frequency at which the value of the direct-current side current gain is equal to a value thereof at a frequency of zero in the frequency characteristic.

5. A rotary electric machine driving device that controls drive of an alternating-current rotary electric machine, the rotary electric machine driving device comprising:

an inverter that is electrically interposed between a direct-current power supply and the rotary electric machine, and converts electric power between a direct current and an alternating current;

a smoothing capacitor that is electrically interposed between the direct-current power supply and the inverter, and is connected between a positive pole and a negative pole on a direct-current side of the inverter; and an inverter control unit that controls switching of a switching element of the inverter according to a predefined switching frequency, wherein a value of a direct-current side voltage gain obtained by dividing a system voltage that is a voltage on the direct-current side of the inverter by a system current that is a current on the direct-current side of the inverter includes a frequency characteristic in which the value of the direct-current side voltage gain increases as the frequency increases from zero, reaches a maximum value at a resonance point at which the frequency becomes a resonance frequency, and decreases as the frequency increases from the resonance point serving as an inflection point, a value of a direct-current side current gain obtained by dividing a current of the direct-current power supply by the system current that is the current, on the direct-current side of the inverter includes a frequency characteristic in which the value of the direct-current side current gain increases as the frequency increases from zero, reaches a maximum value at a resonance point at which the frequency becomes a resonance frequency, and decreases as the frequency increases from the resonance point serving as an inflection point the inverter control unit sets the switching frequency to a frequency that is equal to or higher than the resonance frequency and that is equal to or higher than a frequency at which the value of the direct-current side voltage gain is equal to a value thereof at a frequency of zero in the frequency characteristic, and the inverter control unit sets the switching frequency to a frequency that is equal to or higher than the resonance frequency and that is equal to or higher than a frequency at which the value of the direct-current side current gain is equal to a value thereof at a frequency of zero in the frequency characteristic.

* * * * *